United States Patent
Kataja

[15] 3,651,575
[45] Mar. 28, 1972

[54] RECTANGULAR, LARGE-SIZED CHEESE MOULD

[72] Inventor: Vaino Kataja, Helsinki, Finland
[73] Assignee: MKT-tehtaaty Oy, Helsinki, Finland
[22] Filed: Apr. 9, 1970
[21] Appl. No.: 26,968

[30] Foreign Application Priority Data

Apr. 11, 1969 Finland..............................1066/69

[52] U.S. Cl..........................................31/44, 31/46, 31/20
[51] Int. Cl.........................................A01j 25/08, A01j 25/15
[58] Field of Search..................31/44, 46, 47, 89, 7, 8, 9, 31/20

[56] References Cited

UNITED STATES PATENTS 2,980,538  4/1961  Wolf......................................31/46 X
3,266,145  8/1966  Andersen...................................31/44
3,523,367  8/1970  Czulak..................................31/46 X

FOREIGN PATENTS OR APPLICATIONS 1,337,086  7/1963  France

*Primary Examiner*—Hugh R. Chamblee
*Attorney*—McGlew and Toren

[57] ABSTRACT

This invention relates to an improvement in a rectangular, large cheese mould, one end of which has been designed as a door through which the bottom of the mould and the cheese mattress resting upon this may be extracted in its own plane from the mould, the bottom of the mould consisting of perforated band or net webbing permeable to whey. The invention is characterized in that the bottom of the mould consists of an endless wire, the upper run of which supports the cheese mattress and in connection with the lower run of which a wire-cleaning device has been fitted.

4 Claims, 1 Drawing Figure

Patented March 28, 1972　　　　　　　　　　　　　　3,651,575
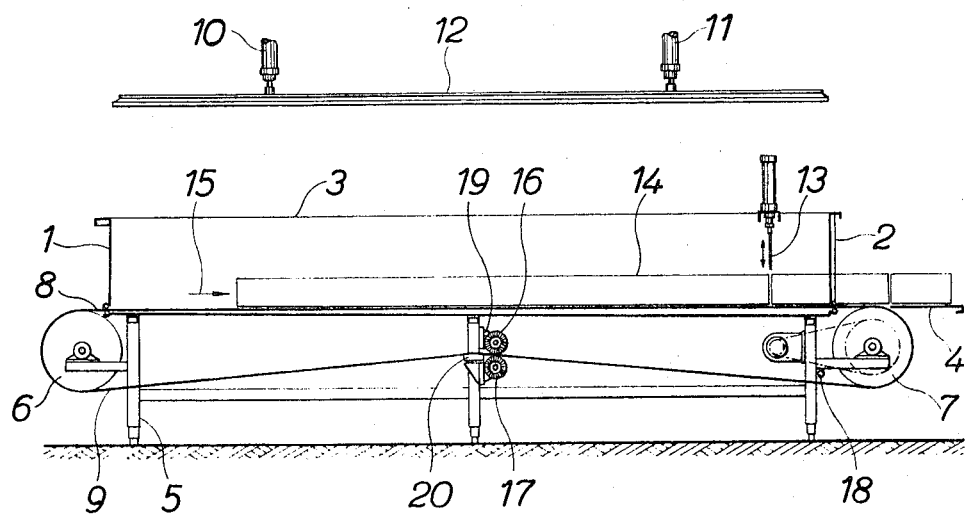
INVENTOR:
VÄINO KATAJA
BY
McGlew & Toren
ATTORNEYS

RECTANGULAR, LARGE-SIZED CHEESE MOULD

The initial part of the procedure in cheese manufacturing takes place in that coagulation and preparation of the cheese curd is accomplished in the cheese kettle. The cheese pulp, which thus is composed of cheese curd and of whey, is poured from the cheese kettle into the cheese mould. The cheese mould retains within it the cheese curd, but lets the whey escape. The escape of the whey is furthermore promoted by pressing. When the whey has escaped, the cheese is taken from the mould.

Removal of the cheese from a small mould causes no difficulties. But in recent time use of large, rectangular moulds has been suggested which have a length of several meters. Special means are required for removing the thick carpet of cheese that has precipitated on the bottom of such a mould.

It has been suggested to make the bottom of the cheese mould of rectangular sections which are permeable to whey, and to design one end of the mould as a door through which the bottom parts of the mould and the cheese mattress resting on them can be extracted from the mould. The drawing job is accomplished by the aid of a traction element, such as a chain or a rope, which has been attached on one hand to one or several bottom parts and on the other hand, to a winch. The bottom parts may be lockable with each other. An arrangement of this kind has the drawback that manipulation of the bottom sections takes a lot of work. When the cheese has been removed from upon the bottom sections, these bottom sections have to be washed and rearranged on the bottom of the mould for the next charge.

Prior art includes also an arrangement in which the bottom of the mould consists of a perforated band or net web, one end of which has been fixed to a drum placed outside the mould, close to its exit end. By rotating the drum, the perforated band or net together with the cheese carpet resting on it may be drawn out from the mould. This arrangement has the drawback that a particular work phase is required in which the perforated band or net is washed and returned into position on the bottom of the cheese mould.

The aim of the present invention is to accomplish an arrangement which is free of the mentioned drawbacks. The invention thus has reference to an arrangement in a rectangular, large cheese mould, one end of which has been designed as a door through which the bottom of the mould and the cheese mattress resting on it may be extracted from the mould in its own plane, the bottom of the mould consisting of perforated band or of a net web permeable to whey. The invention is characterized in that the bottom of the mould consists of an endless wire, the upper run of which supports the cheese mattress, and in connection with the lower run of which there has been arranged a device which cleans the wire.

In an arrangement according to the invention the bottom of the mould is continuously acting. In order to remove the cheese mattress from the mould, the wire is moved so that its upper run travels in the direction towards the exit end of the mould. When the cheese mattress has been removed from the mould, the mould is immediately ready for another charge. In other words, no particular return phase or washing phase is needed.

The invention is described for closer illustration in the following with reference to the attached drawing, which represents a rectangular, large cheese mould in vertical section. The mould is confined by the ends 1 and 2 and the side walls 3, and it rests on feet 5. The bottom of the mould consists of an endless wire 8,9 running over drums 6 and 7, which may be a perforated metal strip, metal webbing, plastic webbing or other similar material, through which the whey may flow. The drum 7 is the drum which applies traction.

A compression plate 12, which is movable by means of pressure cylinders 10 and 11, has been placed above the mould. Upon the side walls 3 of the mould a cutter 13 has been placed, which is dismountable or displaceable so as not to interfere with the compression plate 12 when the cheese mattress on the bottom of the mould is being pressed. The right-hand end 2 of the mould can be opened.

When cheeses are made with the aid of the mould described in the foregoing, cheese pulp, which consists of cheese curd and whey, is poured from the cheese kettle into the mould. The whey runs off from the mould, while the cheese curd is retained in it and forms upon the upper run of the wire 8, a mattress of greater or smaller thickness. Next, the cheese mattress is pressed to compact state with the aid of the pressure plate 12. The pressure to be applied depends on what type of cheese is manufactured. It is obvious that the upper run of the wire 8 is supported from below to tolerate the pressure acting on it. After the pressing operation the cheese mattress can be removed from the mould as such. To do this, the end 2 is opened and the wire 8,9 is started up to move, together with the cheese mattress, in direction of arrow 15. A suitable receiving table 4 has been placed at the right-hand end of the wire 8,9 to receive the cheese mattress. The cheese mattress in the mould may be cut up before it is removed. For this purpose the cutter 13 is mounted in position upon the side walls 3 of the mould. The cutter 13 may either be moved by steps along the cheese mould, or the cheese mattress 14 is moved in direction of arrow 15 past the stationary cutter 13, as has been shown in the drawing.

For the purpose of cleaning the wire, rotating brushes 16 and 17 have been placed on either side of its lower run 9. Furthermore, water or other washing fluid is directed from nozzles 18 and 19 against the wire. This makes the wire arrive in clean condition on the bottom of the mould after passing around the drum 6. For adjustment of the tension of the wire 8,9, its lower run has been arranged to pass over a slide 20, which is adjustable in vertical height.

It is obvious to anyone skilled in the art that different embodiments of the invention may vary within the scope of the patent claims presented below.

I claim:

1. Apparatus for processing cheese, comprising a cheese mould, said mould comprising a pair of laterally spaced side walls and a pair of end walls each extending across one end of said mould between said side walls, one said end wall being openable for removing cheese from within said mould in the plane of the cheese within said mould, a horizontally arranged drum located adjacent to and outwardly from each said end wall of said mould, an endless belt formed of a perforate metal webbing permeable to whey and is trained over said drums with the upper run of said webbing forming the bottom of said mould and means arranged to clean said webbing on its lower run between said drums.

2. Apparatus for processing cheese, as set forth in claim 1, wherein adjustable means are provided in contact with the lower run of said webbing between said drums for effecting an adjustment in the tension of said webbing.

3. Apparatus for processing cheese, as set forth in claim 1, wherein a cutter is displaceably supported on said side walls of said mould for cutting the cheese mould in sections as it is displaced from said mould by moving said webbing over said drums.

4. Apparatus for processing cheese, as set forth in claim 1, wherein a compression plate is positioned above said mould for movement into said mould for effecting a pressing operation on the cheese charged into the mould.

* * * * *

UNITED STATES PATENT OFFICE
CERTIFICATE OF CORRECTION

Patent No. 3,651,575               Dated March 28, 1972

Inventor(s) VAINO KATAJA

It is certified that error appears in the above-identified patent and that said Letters Patent are hereby corrected as shown below:

In the heading of the patent, the name of the assignee should read:

-- MKT-tehtaat Oy, Helsinki, Finland --

Signed and sealed this 1st day of August 1972.

(SEAL)
Attest:

EDWARD M. FLETCHER, JR.　　　ROBERT GOTTSCHALK
Attesting Officer　　　　　　　Commissioner of Patents